Figure 1

Aug. 8, 1972   N. M. HALLMAN   3,682,780
FRACTIONATOR REBOILING BY UTILIZING CONVECTION HEAT
Filed Dec. 29, 1969   3 Sheets-Sheet 2

Figure 2

INVENTOR:
Newt M. Hallman

BY:
James R. Hoatson, Jr.
Philip T. Liggett
ATTORNEYS

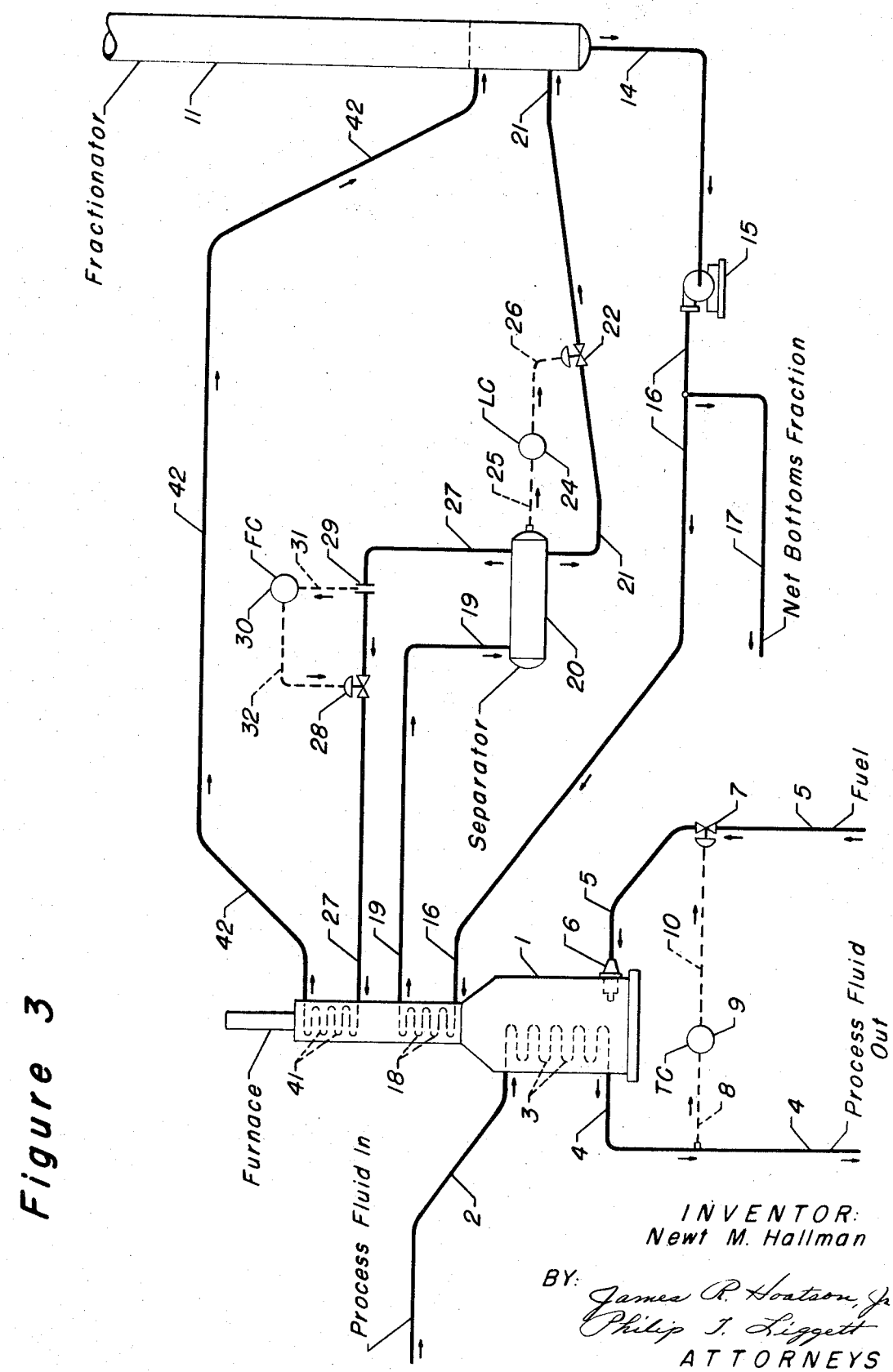

United States Patent Office 3,682,780
Patented Aug. 8, 1972

3,682,780
FRACTIONATOR REBOILING BY UTILIZING CONVECTION HEAT
Newt M. Hallman, Mount Prospect, Ill., assignor to Universal Oil Products Company, Des Plaines, Ill.
Filed Dec. 29, 1969, Ser. No. 888,305
Int. Cl. B01d 3/00, 3/06
U.S. Cl. 203—22       4 Claims

ABSTRACT OF THE DISCLOSURE

Process and system for reboiling a fractionation column by heat exchange with combustion gas in the convection section of a direct fired furnace, wherein the rate of combustion within said furnace is controlled responsive to the heat input demand of a process fluid being heated within the radiant section of the furnace, and wherein the process fluid is independent of the fractionation column reboiling process. Fractionator bottoms liquid is reboiled within the convection coil and separated into heated liquid and heated vapor. The heated liquid is returned to the column by level control while the heated vapor is returned to the column at a rate of flow controlled to maintain the column under thermal equilibrium.

BACKGROUND OF THE INVENTION

The present invention relates to a method and system for reboiling a fractionation column by heat recovery in the convection section of a direct fired furnace.

The present invention more particularly relates to a method and system for reboiling a fractionation column by heat recovery in the convection section of a direct fired furnace wherein the furnace is fired independently of the fractionator reboiling process.

Specifically, the present invention relates to a method and system for reboiling a fractionation column by recovery of sensible heat from combustion gas passing through the convection section of a direct fired furnace, wherein the rate of combustion producing the combustion gas within the furnace is controlled responsive to the heat input demand of a process fluid being heated within the radiant section of the furnace, and wherein the process fluid is independent of the fractionation column reboiling process.

It is well known to those skilled in the art that direct fired furnaces of the type used in petrochemical and petroleum processing absorb heat at a very low thermal efficiency if means is not provided for recovery of sensible heat from the combustion gas being discharged from the furnace. A limiting factor in the design of all direct fired furnaces is the tendency of the heated fluid to decompose or coke at the wall of the heated tubes. This tendency of decomposition limits the rate of radiant heat absorption to a range of from about 6,000 to 20,000 B.t.u. per square foot of tube area, depending on the type of processing operation, because if coke is formed on the tube wall the temperature rises and the tube softens and fails. Consequently, it is typical in the art to design and limit the heat recovery from the fuel burned in the radiant section of the furnace to about 50% of the heat being produced by the combustion of the fuel.

In order to increase the thermal efficiency of the furnace, it is, therefore, standard practice to provide an additional bank of heat exchanger tubes in the convection section of the furnace whereby the sensible heat of the combustion gas may be recovered before the combustion gas passes up the furnace stack. By such a provision for the recovery of heat within the convection section, an additional 25 to 30% of the heat released by combustion may be recovered in the furnace, thereby producing an overall thermal efficiency in the neighborhood of about 75% to 80%. In many instances, the convection tubes are utilized to preheat the fluid which is being heated to its ultimate temperature in the radiant section of the furnace. In other instances, the tubes within the convection section are utilized to generate steam for the refinery. In still other applications, the tubes within the convection section are utilized to impart a heat input to a fluid stream which is totally divorced from the fluid being heated within the radiant section.

One typical application wherein the fluid heated in the convection section is divorced from the fluid heated in the radiant section, is the use of the convection section heat exchanger tubes to reboil a fractionation column which is controlled totally independent of the fluid in the radiant section heat exchanger tubes. For example, in many hydrocarbon conversion processes, such as catalytic reforming and catalytic hydrocracking, the feed hydrocarbon passing into the reactor vessels is preheated to temperatures in the range of from about 900° F. to 1200° F., or even higher. This high temperature severity requirement produces a substantial amount of high temperature combustion gas which must be heat exchanged in the convection section in order to optimize thermal efficiency of the direct fired furnace. However, if space velocity or temperature in the reaction zone is changed due to a change in availability or composition of the hydrocarbon charge stock, or due to a decline in catalyst activity, the heat demand in the radiant section will change and the heat available in the convection section will correspondingly change. Consequently, if the fractionator reboiler circuit utilizing the convection section heat exchanger tubes is a straight-through circulation system of conventional design, wherein reboiler liquid passes into the tubes and heated liquid and vapor pass directly back to the bottom of the fractionation column, the column is subject to operational swinging and upsets due to changes in the heat flux available in the convection section.

SUMMARY OF THE INVENTION

Accordingly, therefore, it is an object of the present invention to provide a method and system for utilizing the convection section of a direct fired furnace to reboil a fractionation column.

It is a further object of the present invention to provide an improved method and system for reboiling a fractionation column by heat recovery in the convection section of a direct fired furnace wherein the fuel burned in the furnace is controlled independently of the fractionation reboiling process.

It is a particular object of the present invention to provide an improved method and system for reboiling a fractionation column by recovery of sensible heat from combustion gas passing through the convection section of a direct fired furnace, wherein the rate of combustion of producing the combustion gas within the furnace is controlled responsive to the heat input demand of a process fluid being heated within the radiant section of the furnace, and wherein the process fluid is independent of the fractionation column reboiling process.

These and other objects of the present invention, as well as the advantages thereof, will become more clear as the invention is more fully disclosed hereinafter.

As is known to those skilled in the art, reboiling of a fractionation column comprises, in its simplest terms, the circulation of a hot liquid to a reboiling heat exchanger wherein the liquid is heated and a substantial amount of the liquid is vaporized. The heated liquid and vapor return to the bottom of the distillation column wherein the vapor passes up into the column to provide a stripping medium for stripping out low boiling constituents from the liquids passing down the column.

The column is kept in thermal balance by the amount of heat passed into the column by the reboiling operation. This heat input to the column is provided in two portions. The first portion is the increased sensible heat of the heated liquid passing back to the column. However, the greatest portion of the heat input is the latent heat of vaporization contained in the vapor passing into the column. Furthermore, the separation efficiency of the distillation is dependent in great part upon the amount of vapor which is produced for stripping low boiling constituents out of the liquid in the stripping section of the column.

Accordingly, then, the basic reboiling process is designed to adjust the flow of heating medium to the reboiler in order to control the heat input into the column to produce a controlled amount of reboiler vapor as required for thermal equilibrium and design separation efficiency.

However, when the reboiler is a coil or heat exchanger tube bank in the convection section of a direct fired furnace, and the furnace is controlled responsive to the heat input demand of a divorced process fluid being independently heated within the radiant section of the furnace, it is not possible to reboil by controlling the heating medium. In this instance, the reboiler heating medium is the combustion gas passing through the convection section of the furnace and transferring heat into the convection coil reboiler. This combustion gas will change in temperature and in rate of flow responsive to the heat input demand of the fluid being heated in the radiant section and it cannot be controlled by the reboiling process occurring in the convection coil.

Since it is therefore not possible to control the heating medium, the essence of the inventive process resides in reboiling within the convection coil by controlling the medium being heated. That is to say, since the flow of reboiler vapor returning to the column is the critical element in maintaining the column under thermal equilibrium, the process of the present invention controls the reboiling function by controlling the actual flow of vapor returning to the column. By controlling the flow of vapor returning to the column, the reboiling function remains virtually constant regardless of fluctuations in the heat availability occurring in the convection section due to fluctuating heat input demands of the independent radiant section.

In one embodiment then, the present invention broadly provides a process for reboiling a fractionation column by recovery of sensible heat from combustion gas passing through the convection section of a direct fired furnace, wherein the rate of combustion producing said combustion gas within said furnace is controlled responsive to the heat input demand of a process fluid being heated within the radiant section of said furnace, and wherein said process fluid is independent of said fractionation column reboiling process, which comprises: (a) passing a liquid from a lower section of the fractionation column to a heat exchanger means contained within said convection section, wherein said liquid recovers heat from said combustion gas under conditions sufficient to produce a heated fluid; (b) passing said heated fluid into a separation zone maintained under conditions sufficient to provide a heated vapor and a heated liquid; (c) passing said heated liquid into said lower section, and thereby providing a first heat input into said fractionation column; (d) passing said heated vapor into said fractionation column at a rate of flow controlled to provide a second heat input into said column sufficient to maintain said column under conditions of thermal equilibrium.

In a further embodiment, the present invention broadly provides a system for reboiling a fractionation column by recovery of sensible heat from combustion gas passing through the convection section of a direct fired furnace, wherein the rate of combustion producing said combustion gas within the said furnace is controlled responsive to the heat input demand of a process fluid being heated within the radiant section of said furnace, and wherein said process fluid is independent of said fractionation column reboiling process, which comprises in combination: (a) heat exchanger means within said convection section; (b) means for passing liquid from a lower section of said fractionation column to said heat exchanger means; (c) phase separation means for separating heated fluid into a heated liquid and a heated vapor; (d) means for passing heated fluid from said heat exchanger means into said phase separation means; (e) means for passing heated liquid from said phase separation means to said lower section of the fractionation column; and (f) means for passing heated vapor from said phase separation means to said fractionation column at a controlled rate of flow.

The present invention is clearly set forth in the accompanying figures which comprise simplified schematic flow diagrams.

FIG. 1 illustrates an embodiment wherein the heat available at the convection coil reboiler is always sufficient to maintain the distillation column under conditions of thermal equilibrium.

FIG. 2 illustrates an embodiment wherein the heat available at the convection coil reboiler is not always sufficient to maintain the column under thermal equilibrium, and/or where the liquid being reboiled contains high boiling liquids subject to thermal decomposition and low boiling components not subject to thermal decomposition.

FIG. 3 illstrates an embodiment wherein the heat available at the convection coil reboiler is always sufficient to maintain the distillation column under thermal equilibrium, but the liquid being reboiled contains high boiling liquids subject to thermal decomposition and low boiling components not subject to thermal decomposition.

DESCRIPTION OF THE DRAWINGS

Referring now to FIG. 1, there is shown a typical direct fired furnace heating a process fluid which enters the furnace via line 2. The process fluid passes into a bank of heat exchanger tubes or a coil 3 located in the radiant section of the furnace, wherein combustion occurs and heat is passed into the process fluid. The heated fluid is wtihdrawn from the radiant coil 3 and furnace 1 via line 4, and thereafter passed to an independent process system, not shown.

Heat is imparted to the process fluid in radiant coil 3 by combustion of fuel which may be a liquid or a vapor. The fuel enters the system via line 5 and passes into a bank of combustion nozzles or burners 6. The rate of combustion of the fuel is varied responsive to the heat input demand of the process fluid being heated in the radiant coil 3. Accordingly, a flow control valve 7 is provided in line 5.

The heat input demand of the process fluid is typically indicated and controlled by a temperature control loop in the furnace outlet line 4. The temperature control loop comprises a thermocouple or other temperature sensing means 8 which passes a temperature signal into a temperature control instrument 9. Temperature controller 9 controls the heat input into the process fluid by sending a control signal via a transmission means 10 to the control valve 7 whereby the flow of fuel is varied or controlled responsive to the signal from the temperature controller 9.

As the fuel is burned in the combustion nozzles 6, approximately 50% of the heat generated thereby passes into the process fluid at the radiant coil 3. The remaining energy of combustion is contained in the resulting combustion gases which leave the radiant section of the furnace and pass into the convection section, typically at temperatures in the range of from about 1400° F. to 1600° F. It is this energy contained in the high temperature combustion gases which is sought to be recovered in the convection section by independently reboiling a fractionating column 11.

Fractionator 11 may be any typical fractionating column. For illustrative purposes, fractionator 11 is shown with a fractionator feed entering the column via line 12 at a central section of the column. Thus fractionator 11 is illustrated as containing a rectification section and a stripping section, but the fractionator 11 may, in fact, comprise only a stripping section or only a rectification section. Fractionator 11 is typically operated to separate the lower boiling components of the fractionator feed from the heavier boiling components of the feed. Lower boiling components of the fractionator feed are removed as vapor from the top of fractionator 11 via line 13. These vapors are typically passed to a conventional overhead system which is not shown on the drawing. The overhead system condenses the vapors and returns at least a portion of the condensed liquid as reflux to fractionator 11 via line 23.

The higher boiling constituents of the fractionator feed pass down the column and are accumulated in a lower section of fractionator 11. This liquid is typically withdrawn from the lower section via line 14 by means of a pump 15. The pump receives the bottoms liquid substantially at its bubble point and discharges it at a slightly elevated pressure into line 16. A portion of the liquid is typically withdrawn via line 17 as a net bottoms fraction, and sent to storage or to other processing facilities not shown. The major portion of the liquid continues along line 16 and passes into the furnace 1 wherein the liquid is reboiled in a coil or tube bank 18 contained within the convection section of the furnace. As the hot combustion gases pass through the convection section, heat is passed into the liquid, and the liquid is thereby heated to produce a fluid comprising liquid and vapor at elevated temperature.

The heated fluid is withdrawn from furnace 1 and convection coil 18 via line 19, and passed into a separator 20. The heated fluid is separated therein into a heated liquid phase and into a vapor phase. The liquid fraction is withdrawn from separator 20 via line 21, and returned to the lower section of fractionator 11. The rate of return of this liquid phase from separator 20, is typically controlled by a level control means. The level control loop comprises a control valve 22 which receives a level signal from the level control instrument 24. The level control instrument receives a level indicating signal via a transmitting means 25 which may comprise a float mechanism or any other conventional level indicating means. The level controller 24 sends a control signal via a transmitting means 26 to control valve 22, thereby allowing liquid to pass into the fractionator 11 via line 21 while maintaining a constant level of liquid within the separator 20.

The vapor phase which is separated from the heated fluid within separator 20, is withdrawn therefrom via line 27 and passed into the lower section of fractionator 11. In order to maintain the proper amount of reboiling or heat input into fractionator 11, the rate of withdrawal of vapor from separator 20 is controlled. This control is achieved by means of a flow control loop. The flow control loop comprises a flow indicating means such as an orifice 29 sending a signal to a flow controller 30 via a transmitting means 31. The flow controller 30 sends a flow control signal via line 32 to a control valve 28 located in line 27.

As noted hereinabove, the flow of vapor passing into fractionator 11 via line 27 is maintained consistent with the requirements for thermal equilibrium within fractionator 11. This vapor flow maintains fractionator 11 under equilibrium conditions despite any fluctuations occurring within furnace 1. However, flow controller 30 may be provided with an automatically adjustable setpoint so that the rate of flow may be readjusted as operation within fractionator 11 fluctuates due to changes in composition of the fractionator feed, or due to changes in the rate of feed, or due to other operational disturbances occurring within the fractionating column.

Figure 1:
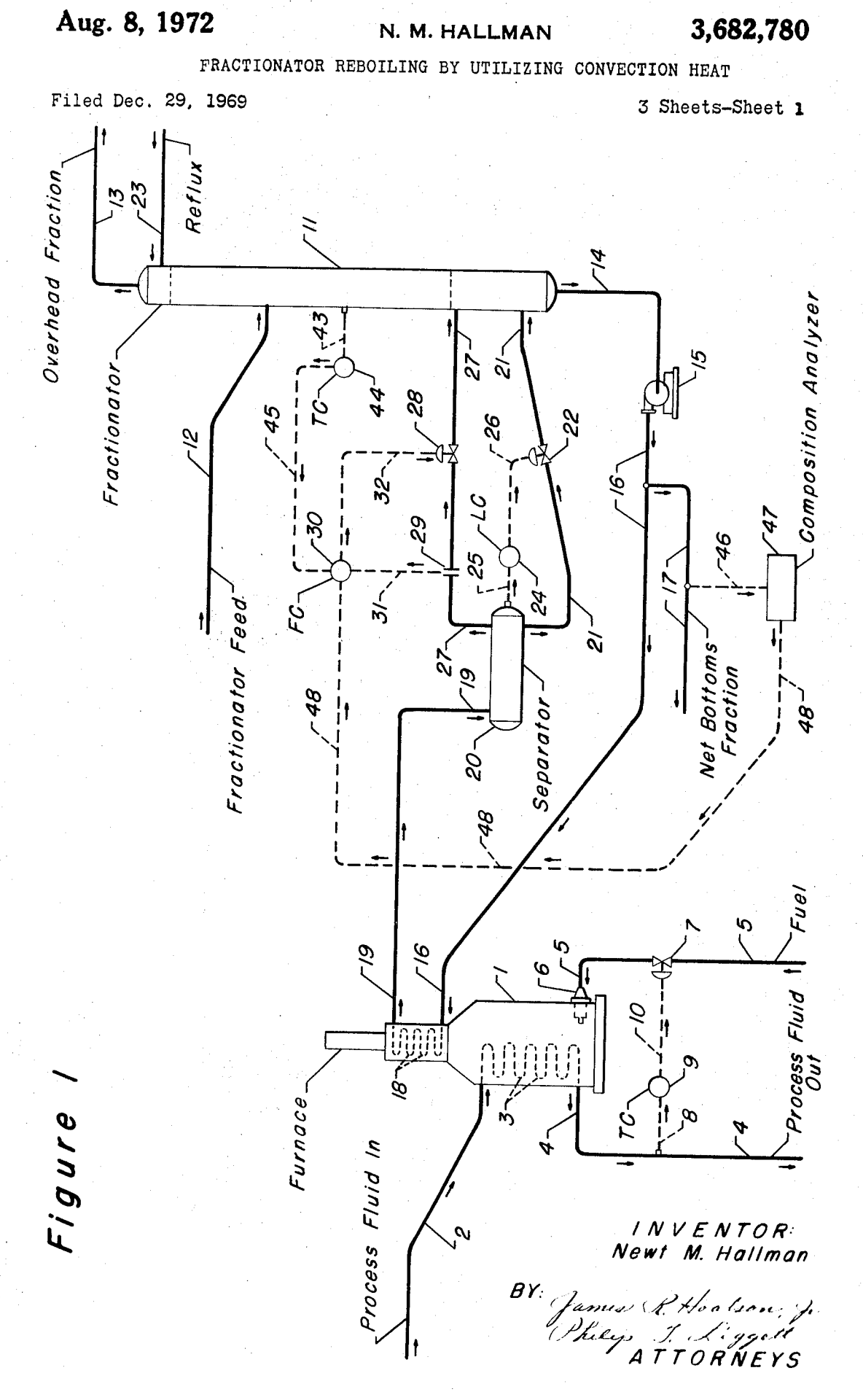

Accordingly, there is shown in FIG. 1, a temperature sensing means such as thermocouple 43 sending a temperature signal to a temperature controller 44. The temperature controller 44 passes a temperature control signal to the automatically adjustable setpoint of flow controller 30. In this manner, if the operation within fractionator 11 changes thermally, the change will be sensed by the temperature controller 44 and a compensating adjustment will be made at the automatically adjustable setpoint of flow controller 30, to provide the amount of hot vapor entering the column via line 27 which is necessary for the maintainence of thermal equilibrium in fractionator 11.

Similarly, there may be provided in the fractionating system a composition analyzer which will sense any changes in the degree of separation between the components which is occurring within the fractionator 11. Referring to FIG. 1, there is shown a composition analyzer 47 receiving a sample of net bottoms fraction from the process line 17 via a sample line 46. The composition analyzer may comprise any typical prior art analyzer such as a chromatographic analyzer or a stabilized cool flame analyzer of the type described in U.S. patent, 3,463,613, which issued to E. R. Fenske et al. on Aug. 26, 1969. The composition analyzer will sense any deviations from the desired composition of the net bottoms fraction and send a compensating signal via transmitting means 48 to the automatically adjustable setpoint of the flow controller 30. Thus, if the operation within fractionator 11 varies from the design constituent separation efficiency, the flow controller 30 will adjust the flow of hot vapor passing into fractionator 11 via line 27 in order to reestablish the proper amount of stripping occurring within the fractionating column and thereby return the net bottoms fraction to the specification composition.

As noted hereinabove, FIG. 1 illustrates an embodiment wherein the heat available at the convection coil 18 is always sufficient to maintain the distillation column 11 under conditions of thermal equilibrium notwithstanding fluctuations in the heat demand of the process fluid passing through the radiant coil 3. FIG. 2 illustrates an embodiment wherein the heat available at the convection coil reboiler is not always sufficient to maintain the column under thermal equilibrium. Additionally, the system disclosed in FIG. 2 has utility where the liquid being reboiled within coil 18 contains high boiling liquids subject to thermal decomposition and low boiling components not subject to thermal decomposition. In such an embodiment then, it is desired to use the convection coil 18 to extract whatever heat is economically available from the convection gases, or to bring the temperature of the reboiled liquid to a point below the level of thermal decomposition, and to thereafter separate the heated fluid into the vapor and liquid phases within separator 20 as hereinabove described.

Referring now to FIG. 2, there is again shown the basic system illustrated in FIG. 1. However, the vapor which is withdrawn from separator 20 via line 27 is passed through a supplementary heat exchanger wherein sufficient degrees of superheat are passed into the thermally stable low boiling vapor to maintain the fractionating column 11 under conditions of thermal equilibrium. Since the heavy liquid which contains thermally unstable constituents is passed into the fractionator 11 via line 21 without additional heating, little or no thermal decomposition will occur in the system. As more heat is necessary for proper fractionation in column 11, this heat will be supplied by the superheater 33 into which is introduced the thermally stable vapor constituents from line 27. Superheater 33 will typically be provided with a heating medium entering the exchanger via line 34 and being discharged via line 35. The degree of superheat passed into the reboiled vapor is maintained by control of the flow of heating medium as provided by a temperature control loop. The temperature control loop will comprise a temperature sensing means such as a thermocouple 38 located in the vapor line 40 which passes the heated vapor into the fractionator 11. Thermocouple 38 sends a temperature signal to a temperature controller 37 which then sends a control signal via transmitting means 39 to the control valve 36 located in line 35. Alternatively, thermocouple 38 may be located within fractionator 11 in the manner shown for thermocouple 43 in FIG. 1.

In any case, the flow of vapor leaving separator 20 via line 27 is maintained consistent with the heat available at convection coil 18, while at the same time providing that the temperature of the heated fluid leaving via line 19 is below the temperature of instability of the thermally unstable constituents contained within the fluid. Fractionator 11 is then maintained under conditions of thermal equilibrium by control of the amount of superheat passed into the thermally stable vapor which passes through superheater 33 before passing into the column.

As used herein, the term "thermally unstable constituents" refers to those components of the liquid being heated in coil 18 which cause degradation of product quality such as discoloration, dehydrogenation, cracking, coking, polymerization, etc., and which are caused to chemically degrade by exposure to elevated temperature levels within coil 18. Similarly, "thermally stable constituents" are those components of the liquid being heated in coil 18 which do not undergo chemical degradation due to elevated temperatures.

Referring now to FIG. 3, there is shown an embodiment wherein the heat available in the convection zone of furnace 1 is always sufficient to maintain the distillation column 11 under thermal equilibrium, but the liquid being reboiled within coil 18 contains high boiling liquids subject to decomposition and low boiling components not subject to thermal decomposition. In this embodiment the liquid is heated within convection coil 18 to a temperature below the point of thermal decomposition. The heated fluid is withdrawn therefrom via line 19 and passed into separator 20 wherein the liquid and vapor phases are separated. The liquid phase, containing thermally unstable constituents, returns to fractionator 11 via line 21 in the manner disclosed hereinabove. The vapor phase is withdrawn via line 27 and passed at a controlled rate through orifice 29 and valve 28, and is thereafter passed into an additional heat exchanger coil 41 located within the convection section of furnace 1. Coil 41 is provided within the convection section to impart superheat to the vapor passing therethrough. The superheated vapor, which is not thermally unstable, is withdrawn from coil 41 via line 42, and passed into fractionator 11 at a rate sufficient to maintain the column under conditions of thermal equilibrium.

PREFERRED EMBODIMENTS

The method of operation of the present invention will be clear to those skilled in the art from the foregoing discussion.

In particular, those skilled in the art will realize that while flow controller 30 is controlling the flow of vapor into fractionator 11 via line 27 in order to maintain thermal equilibrium in the column, controller 30 is in fact controlling the heat input into the heated fluid at coil 18 by imposing a back pressure on separator 20 and coil 18. If more heat is required in column 11, flow controller 30 opens valve 27 wider, thus decreasing the back pressure. With decreased back pressure more liquid will vaporize in coil 18 thus picking up more heat from the convection section of furnace 1. The additional heat picked up is equal to the latent heat of vaporization required to vaporize the additional vapor passing into fractionator 11 via line 27. When the control system of the present invention requires less vapor to pass into fractionator 11 for thermal equilibrium, flow controller 30 will reduce the opening through valve 28, thereby increasing the back pressure on separator 20 and coil 18. The increased back pressure will cause a reduction in the amount of liquid which is vaporized within coil 18, thereby reducing the latent heat of vaporization which passes into fractionator 11 with the total vapor. Thus, those skilled in the art will realize that a pressure control loop or an equivalent control system for imposing the back pressure at coil 18 may be utilized in place of the flow control loop which has been shown in line 27 in FIGS. 1 through 3. However, the preferred embodiment is to utilize the flow control loop illustrated, since while pressure is the physical phenomenon which effects the amount of vaporization occurring in coil 18, the method of controlling the heat input into fractionator 11 is to control the rate of flow of vapor, and some flow indicating means is necessary therefor.

While temperature controller 44 and composition analyzer 47 were not shown in FIGS. 2 and 3 for the sake of simplicity, those skilled in the art realize that these additional control instruments may be employed in the two embodiments which are illustrated in FIGS. 2 and 3. Furthermore, those skilled in the art will realize that thermocouple 43 is not necessarily limited to the stripping section of fractionator 11 as shown in FIG. 1. Temperature controller 44 may sense the temperature any place in fractionator 11 as, for example, by placing thermocouple 43 in column 11 above inlet line 12, or in line 13, or in line 27. Similarly, composition analyzer 47 can take any sample of fluid as by running sample line 46 from process line 23 or from process line 13, instead of from line 17 as illustrated in FIG. 1.

These and other modifications to the present invention will be readily apparent to those skilled in the art and should not be construed in any manner to detract from the broadness of the present invention.

However, it may now be summarized that a preferred embodiment comprises a system for reboiling a fractionation column by recovery of sensible heat from combustion gas passing through the convection section of a direct fired furnace, wherein the rate of combustion producing said combustion gas within said furnace is controlled responsive to the heat input demand of a process fluid being heated within the radiant section of said furnace, and wherein said process fluid is independent of said fractionation column reboiling process, which comprises in combination: (a) first heat exchanger means, contained with said convection section; (b) means for passing liquid from a lower section of said fractionation column to said heat exchanger means; (c) phase separation means for separating heated fluid into a heated liquid and a heated vapor; (d) means for passing heated fluid from said first heat exchanger means into said phase separation means; (e) means for passing heated liquid from said phase separation means to said lower section of the fractionation column; (f) second heat exchanger means adapted to superheat said heated vapor; (g) means for passing heated vapor from said phase separation means to said second heat exchanger means at a controlled rate of flow; and, (h) means for passing superheated vapor from said second heat exchanger means to said fractionation column.

Furthermore, it may be summarized that a particularly preferred embodiment comprises this system, wherein the second heat exchanger means is contained within the convection section.

The invention claimed:
1. In a process for reboiling a fractionation column by recovery of sensible heat from combustion gas passing through a convection section of a direct fired furnace having also a radiantly heated section, wherein the rate of combustion producing said combustion gas within said furnace is controlled responsive to the heat input demand of a process fluid being heated within the radiant section of said furnace, and wherein said process fluid is independent of said fractionation column reboiling process, said radiant section being operated at relatively low efficiency and producing waste gases at relatively high temperatures, the steps comprising:

(a) passing the bottoms from the lower section of said fractionation column into indirect heat exchange relationship with said waste gas in said convection section wherein said bottoms recover heat from said gas under conditions sufficient to produce a heated fluid, the liquid side of said convection section being at temperature conditions sufficient to generate liquid and vapor phases of said bottoms in said convection section;

(b) passing said liquid and vapor phases into a separation zone outside said column and therein separating said phases into a heated liquid and a heated vapor stream; and (c) returning said hot liquid stream to the lower portion of the column under control of the liquid level in the separation zone, passing the hot vapor stream to an intermediate portion of the column, and regulating the flow conditions of said vapor stream to the column under control of fractionator fluid parameters to maintain thermal equilibrium in said column.

2. Process of claim 1 wherein said conditions within said heat exchanger means and within said separation zone include a pressure elevated above the pressure obtaining within said lower section of said fractionation column.

3. Process of claim 2 wherein said heated vapor from said separation zone is passed through a second heat exchanger means and superheated therein before passing into said fractionation column.

4. Process of claim 3 wherein said second heat exchanger means is contained within said convection section, and said heated vapor is superheated therein by recovery of heat from said combustion gas.

References Cited
UNITED STATES PATENTS

| | | | |
|---|---|---|---|
| 2,164,132 | 6/1939 | Doherty | 196—132 X |
| 2,974,182 | 3/1961 | Van Pool | 196—132 X |
| 3,223,749 | 12/1965 | Van Pool et al. | 196—132 X |
| 3,249,519 | 5/1966 | Cabbage et al. | 196—132 X |
| 3,441,483 | 4/1969 | Hart | 196—132 X |
| 3,463,725 | 8/1969 | MacFarlane et al. | 203—3 X |
| 1,976,469 | 10/1934 | Youker | 196—132 X |
| 2,080,221 | 5/1937 | De Florez | 196—132 X |
| 2,085,422 | 6/1937 | Fast | 196—132 X |
| 2,151,310 | 3/1939 | Aldridge et al. | 196—132 X |
| 3,223,749 | 12/1945 | Van Pool | 196—132 X |

NORMAN YUDKOFF, Primary Examiner

J. SOFER, Assistant Examiner

U.S. Cl. X.R.

202—160; 203—25, 27, 88, 100; 208—350, Dig. 1